United States Patent
Chu et al.

(10) Patent No.: US 8,966,120 B2
(45) Date of Patent: *Feb. 24, 2015

(54) METHOD AND SYSTEM FOR PROVIDING A PRIORITY-BASED, LOW-COLLISION DISTRIBUTED COORDINATION FUNCTION

(75) Inventors: Liwen Chu, San Jose, CA (US); Mario Valerio Filauro, Albany, CA (US)

(73) Assignee: STMicroelectronics, Inc., Coppell, TX (US)

( * ) Notice: Subject to any disclaimer, the term of this patent is extended or adjusted under 35 U.S.C. 154(b) by 2111 days.

This patent is subject to a terminal disclaimer.

(21) Appl. No.: 10/955,948

(22) Filed: Sep. 30, 2004

(65) Prior Publication Data

US 2006/0034210 A1    Feb. 16, 2006

Related U.S. Application Data

(60) Provisional application No. 60/600,885, filed on Aug. 12, 2004.

(51) Int. Cl.
    *G06F 15/173*    (2006.01)
    *H04W 74/08*    (2009.01)

(52) U.S. Cl.
    CPC ............................. *H04W 74/0825* (2013.01)
    USPC ........................................................ 709/243

(58) Field of Classification Search
    USPC .......... 709/207, 240, 233–235; 370/310, 328, 370/338, 445, 448
    See application file for complete search history.

(56) References Cited

U.S. PATENT DOCUMENTS

| | | | | |
|---|---|---|---|---|
| 6,813,260 | B1* | 11/2004 | Fogle | 370/338 |
| 6,965,942 | B1* | 11/2005 | Young et al. | 709/232 |
| 7,054,640 | B2* | 5/2006 | Bing et al. | 455/452.1 |
| 7,095,754 | B2* | 8/2006 | Benveniste | 370/465 |
| 7,233,603 | B2* | 6/2007 | Lee | 370/445 |
| 7,272,119 | B2* | 9/2007 | Rudnick et al. | 370/329 |
| 7,280,517 | B2* | 10/2007 | Benveniste | 370/338 |
| 2003/0103521 | A1* | 6/2003 | Raphaeli et al. | 370/445 |
| 2004/0156351 | A1* | 8/2004 | Kim | 370/349 |
| 2005/0025176 | A1* | 2/2005 | Ko et al. | 370/448 |
| 2005/0036475 | A1* | 2/2005 | Nishiyama et al. | 370/347 |

OTHER PUBLICATIONS

Deng et al., "A priority Scheme for IEEE 802.11 DCF Access Method", IEICE. Commun., vol. E82-B, No. 1 Jan. 1999.*
Hiertz et al., "A decentralized reservation scheme for IEEE 802.11 ad hoc networks", PIMRC 2003. 14th IEEE Proceedings, vol. 3, pp. 2576-2580, Sep. 7-10, 2003.*
Sheu et al., "A priority MAC protocol to support real-time traffic in ad hoc networks Wireless Networks", vol. 10 , Issue 1 (Jan. 2004), pp. 61-69.*
Kwon et al, "A novel MAC protocol with fast collision resolution for wireless LANs," in Proc. IEEE Int. Conf. Computer Communications (INFOCOM), San Francisco, CA, 2003, pp. 853-862.*

* cited by examiner

*Primary Examiner* — Scott Christensen
(74) *Attorney, Agent, or Firm* — Seed IP Law Group PLLC (57) ABSTRACT

A method for providing a priority-based, low-collision distributed coordination function in a wireless network that includes a plurality of stations is provided. The method includes determining a priority for a first station and selecting a back-off time for the first station based on the priority.

26 Claims, 4 Drawing Sheets

METHOD AND SYSTEM FOR PROVIDING A PRIORITY-BASED, LOW-COLLISION DISTRIBUTED COORDINATION FUNCTION

RELATED APPLICATIONS

This application claims priority under 35 U.S.C. Section 119(e) to U.S. Provisional Patent Application No. 60/600,885, filed Aug. 12, 2004, which is hereby incorporated by reference, and is related to co-pending U.S. application Ser. No. 10/954,660, entitled "Method and System for Providing a Priority-Based, Low-Collision Distributed Coordination Function Using a Super-Frame Structure".

TECHNICAL FIELD OF THE INVENTION

The present invention is directed in general to wireless area networks and, more specifically, to a method and system for providing a priority-based, low-collision distributed coordination function.

BACKGROUND OF THE INVENTION

The IEEE 802.11 WLAN is one of the most deployed wireless technologies and will play a major role in next-generation wireless communication networks. To share the wireless medium, the IEEE 802.11 standard defines two access methods at the medium access control (MAC) layer: the mandatory distributed coordination function (DCF) and the optional point coordination function (PCF).

DCF uses a carrier sense multiple access with collision avoidance (CSMA/CA) method to decide which station in the network should send the packets out. No coordination is proposed in DCF so many collisions occur, especially in high load WLANs. This causes the WLAN throughput to become worse.

In an infrastructure basic service set (BSS), PCF can be used and the access point (AP) keeps polling the non-AP stations to coordinate access to the wireless medium, but the realization of this is complicated because the AP has to poll the non-AP stations for the transmission of each polled packet. Furthermore, it is difficult to integrate an effective power saving mode into it.

In CSMA/CA, stations listen to the wireless medium to determine when it is free. Once a station detects that the medium is free, it begins to decrement its back-off counter. Each station maintains a contention window (CW) that is used to determine the number of slot times a station has to wait before transmission. The back-off counter only begins to decrement after the medium has been free for a DCF Inter-Frame Space (DIFS) period. If the back-off counter expires and the medium is still free, the station begins to transmit. Thus, it is possible that two stations may begin to transmit at the same time, in which case a collision occurs.

The collisions (or other transmission problems) are detected by the lack of an acknowledgement from the receiver. After the detection of a collision, the station randomly picks a new back-off period from its CW (the CW grows in a binary exponential fashion) and then attempts to gain control of the medium again. Due to collisions and the binary back-off mechanism, there are no transmit guarantees with DCF and, as described above, these problems are made worse by the lack of coordination available with the use of DCF.

SUMMARY OF THE INVENTION

In accordance with the present invention, a method and system for providing a priority-based, low-collision distributed coordination function (DCF) are provided. In particular, a back-off time is selected based on a priority for the station, thereby allowing the high priority station a greater probability of successful transmission as compared to a low priority station.

According to one embodiment of the present invention, a method for providing a priority-based, low-collision DCF in a wireless network that includes a plurality of stations is provided. The method includes determining a priority for a first station and selecting a back-off time for the first station based on the priority.

According to another embodiment of the present invention, a method for providing a priority-based, low-collision DCF in a wireless network that includes a plurality of stations is provided. The method includes receiving high priority station identification information carried in a data packet or other packet at a first station from a second station. A priority is determined for the first station based on the information. A back-off time is selected for the first station based on the priority.

According to yet another embodiment of the present invention, a method for providing a priority-based, low-collision DCF in a wireless network that includes a plurality of stations is provided. The method includes selecting a next high priority station from a neighbor list for a first station. The first station comprises a station of the current transmission opportunity owner. High priority station identification information is transmitted from the first station to the remaining plurality of stations. The information is operable to identify the selected next high priority station.

According to still another embodiment of the present invention, a priority-based back-off module for use in providing a low-collision DCF in a wireless network is provided. The wireless network includes a plurality of stations. Each station comprises a back-off module, and the back-off module includes a priority selector and a back-off time generator. The priority selector is operable to select a priority for the station. The back-off time generator is operable to generate a back-off time based on the selected priority.

Technical advantages of one or more embodiments of the present invention include providing an improved method for providing a low-collision DCF. In a particular embodiment, a priority-based method is used in selecting back-off times. As a result, a station with a high priority selects a back-off time from a shorter contention window, while a station with a low priority status selects a back-off time from a longer contention window. Accordingly, the high priority station is more likely to be able to acquire the right to access the medium than the low priority station.

In another particular embodiment, each station maintains a neighbor list, and the station of the current transmission opportunity owner selects the next high priority station from its neighbor list. The selection may be based on a weight-based algorithm, a probability-based algorithm, or any other suitable algorithm. Selection information is then sent to the other stations so that the next high priority station is able to identify itself from the selection information.

Other technical advantages will be readily apparent to one skilled in the art from the following figures, description, and claims.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented for any suitably arranged wireless station.

Figure 1:
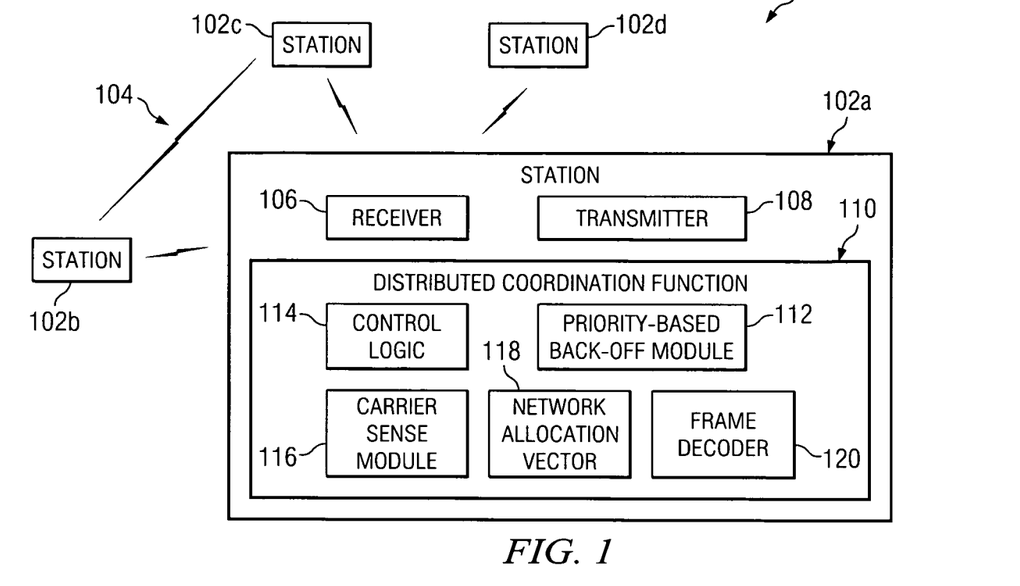
FIG. 1 is a block diagram illustrating a system for providing a priority-based, low-collision distributed coordination function (DCF) in accordance with one embodiment of the present invention.

FIG. 1 is a block diagram illustrating a system 100 for providing a priority-based, low-collision distributed coordination function (DCF) in accordance with one embodiment of the present invention. The system 100 comprises a basic service set (BSS). The BSS may be an independent BSS or an infrastructure BSS.

The system 100 comprises a plurality of stations 102 that are each operable to communicate with other stations 102 over a wireless medium 104. As used herein, "each" means every one of at least a subset of the identified items. It will be understood that one of the stations 102 may comprise an access point for the embodiment in which the system 100 comprises an infrastructure BSS. For this embodiment, the stations 102 are operable to communicate with other stations 102 through the access point.

The station 102a is illustrated in detail; however, it will be understood that the components illustrated in the station 102a are also implemented in the other stations 102b-d. In addition, although the illustrated embodiment includes four stations 102a-d, it will be understood that the system 100 may comprise any suitable number of stations 102 without departing from the scope of the present invention.

Each station 102 comprises a receiver 106, a transmitter 108, and a DCF 110. It will be understood that the station 102 may comprise any other suitable components without departing from the scope of the present invention. The receiver 106 is operable to receive data from other stations 102 over the wireless medium 104, and the transmitter 108 is operable to transmit data to other stations 102 over the wireless medium 104.

The DCF 110 is operable to determine when the station 102 should attempt to transmit data and, based on that determination, to notify the transmitter 108 to begin transmitting. The DCF 110 comprises a priority-based back-off module 112, control logic 114, a carrier sense module 116, a network allocation vector 118, and a frame decoder 120. It will be understood that the DCF 110 may comprise any other suitable components without departing from the scope of the present invention.

The priority-based back-off module 112 is operable to maintain a back-off timer for use in determining a transmit time for the station 102. The length of the back-off timer is based on a priority for the station 102, as described in more detail below.

The control logic 114 is operable to determine that the station 102 is ready to transmit data, to determine that the medium 104 is likely to be available, to determine that the back-off timer has expired, and to enable the station 102 to transmit the data when the medium 104 is likely to be available and the back-off timer has expired. The carrier sense module 116 is operable to sense the medium 104, or carrier, in order to determine whether or not the medium 104 is busy or idle. The network allocation vector 118 is operable to predict future traffic on the medium 104 based on information provided by the frame decoder 120.

The frame decoder 120 is operable to determine whether data received at the receiver 106 has the station 102 as its destination and to decode duration information in the received data or the next high priority station information. For one embodiment, the duration information relates to the wireless medium time owned by the station of the current transmission opportunity owner. Thus, for example, the duration information may comprise a total medium occupied time of frames, a remaining medium occupied time of frames or any other suitable value operable to identify how much longer the medium 104 will be busy with the data currently being received.

In operation, according to one embodiment, the transmitter 108 generates a "transmit ready" signal when the station 102 is ready to transmit data and provides that signal to the control logic 114. Thus, for this embodiment, the control logic 114 determines that the station 102 is ready to transmit data based on the receipt of the "transmit ready" signal from the transmitter 108.

The frame decoder 120 decodes duration information from data received at the receiver 106 and provides the duration information to the network allocation vector 118. Based on the duration information, the network allocation vector 118 predicts future traffic on the medium 104. The prediction is provided to the carrier sense module 116 in the form of a predicted medium state. For example, the network allocation vector 118 may provide a Logic 1 value to the carrier sense module 116 when the network allocation vector 118 predicts that the medium 104 is busy and a Logic 0 value when it predicts that the medium 104 is idle. It will be understood that the network allocation vector 118 may otherwise notify the carrier sense module 116 of its prediction without departing from the scope of the present invention.

The carrier sense module 116 senses the medium 104 to determine a sensed medium state. When the carrier sense module 116 determines that the sensed medium state is idle and the network allocation vector 118 provides the carrier sense module 116 with a predicted medium state of idle, the carrier sense module 116 notifies the control logic 114 that the medium 104 is idle.

In this embodiment, the control logic 114 determines that the medium 104 is likely to be available based on this notification received from the carrier sense module 116. The control logic 114 then activates the priority-based back-off module 112. The back-off module 112 randomly selects a back-off time from one of at least two contention windows that provide minimum and maximum back-off times. The contention window from which the back-off time is selected is determined based on a priority for the station 102. For example, for one embodiment, the station 102 may be in either a high priority state or a low priority state. In this case, the back-off module 112 randomly selects a back-off time from a high priority contention window if the station 102 is in the high priority state and randomly selects a back-off time from a low priority contention window if the station 102 is in the low priority state.

If the control logic 114 tells the back-off module 112 that the medium 104 is idle for a time slot, the randomly selected back-off time is decremented by 1. After the randomly selected back-off time becomes 0, the back-off module 112 notifies the control logic 114 that the back-off timer has expired, and the control logic 114 enables the station 102 to transmit the data. For example, the control logic 114 may provide a "transmit clear" signal to the transmitter 108.

After the data is transmitted, if an acknowledgement is not received at the receiver 106 within a specified period of time, the control logic 114 may re-activate the back-off module 112, which will randomly select another back-off time, and provide another "transmit clear" signal to the transmitter 108 if the medium 104 is still idle once the back-off timer expires again. In this way, the control logic 114 may prompt the transmitter 108 to re-transmit data that may have been lost due to collisions or other transmission problems.

After unsuccessful data transmission or the wireless medium 104 changing from idle to busy, the control logic 114 may notify the back-off module 112 to change the priority from high priority to low priority.

Figure 2:
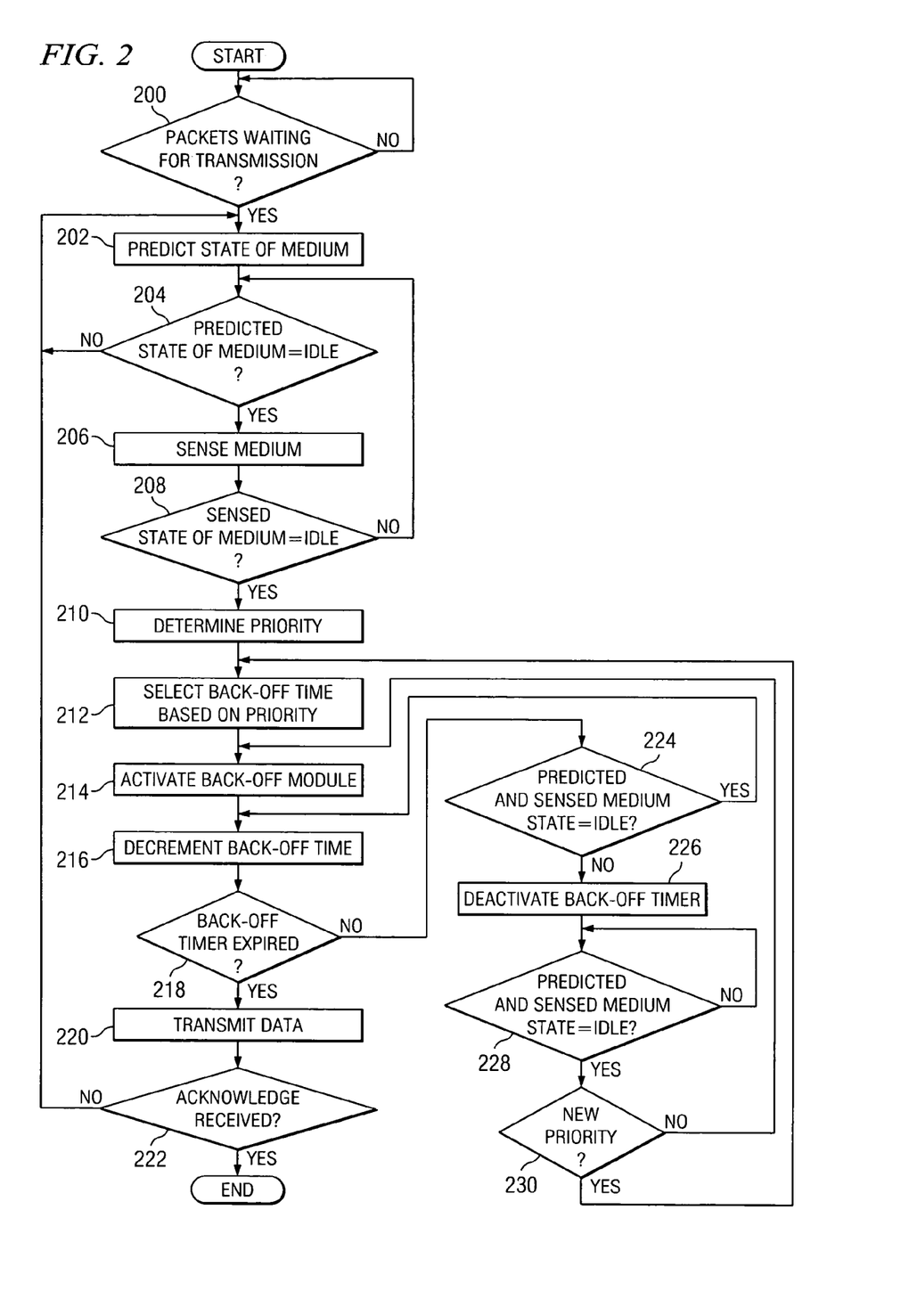
FIG. 2 is a flow diagram illustrating a method for providing a priority-based, low-collision DCF in accordance with one embodiment of the present invention.

FIG. 2 is a flow diagram illustrating a method for providing a priority-based, low-collision DCF in accordance with one embodiment of the present invention. The method begins at decisional step 200 where the control logic 114 determines whether there are any packets in the MAC layer waiting for transmission. If no packet is waiting for transmission, the method follows the No branch from decisional step 200 and remains at decisional step 200 until a packet is waiting for transmission. If a packet is waiting for transmission, the method follows the Yes branch from decisional step 200 to step 202. At step 202, the network allocation vector 118 predicts the state of the medium 104 and provides the predicted medium state to the carrier sense module 116.

At decisional step 204, the carrier sense module 116 determines whether the predicted medium state provided by the network allocation vector 118 is idle. If the predicted medium state is not idle, the method follows the No branch from decisional step 204 and returns to step 202 where the network allocation vector 118 continues to predict the medium state until the predicted medium state is idle.

Once the predicted medium state is idle, the method follows the Yes branch from decisional step 204 to step 206. At step 206, the carrier sense module 116 senses the medium 104 in order to determine its sensed medium state.

At decisional step 208, the carrier sense module 116 determines whether the sensed medium state of the medium 104 is idle. If the sensed medium state is not idle, the method follows the No branch from decisional step 208 and returns to decisional step 204, where the carrier sense module 116 continues to determine whether the predicted medium state remains idle.

If the sensed medium state is idle, the method follows the Yes branch from decisional step 208 to step 210. At step 210, the priority-based back-off module 112 determines the priority of the station 102. For example, according to one embodiment, the back-off module 112 may determine whether the station 102 is in a high priority state or a low priority state. It will be understood that the station 102 may be in one of more than two priority states without departing from the scope of the present invention. For example, the station 102 may be in one of a high priority state, a medium priority state and a low priority state.

At step 212, the back-off module 112 randomly selects a back-off time for the back-off timer based on the priority of the station 102. Thus, for example, if the station 102 is in a high priority state, the back-off module 112 may select a back-off time from a high priority contention window. However, if the station 102 is in a low priority state, the back-off module 112 may select a back-off time from a low priority contention window, which is longer than the high priority contention window. At step 214, the control logic 114 activates the back-off module 112 because the medium 104 is idle. At step 216, the back-off time for the back-off timer is decremented by 1.

At decisional step 218, the back-off module 112 determines whether or not the back-off timer has expired. If the back-off timer has expired, the method follows the Yes branch from decisional step 218 to step 220.

At step 220, the control logic sends a "transmit request" signal to the transmitter 108. After it receives a "transmit ready" signal from the transmitter 108, the control logic 114 provides the "transmit clear" signal to the transmitter 108, which transmits the data across the medium 104.

At decisional step 222, the control logic 114 determines whether an acknowledgement has been received in response to the transmitted data. If no acknowledgement has been received, the method follows the No branch from decisional step 222 and returns to step 202 where the state of the medium 104 is predicted. However, if an acknowledgement has been received, the method follows the Yes branch from decisional step 222 and comes to an end.

Returning to decisional step 218, if the back-off timer has not expired, the method follows the No branch from decisional step 218 to decisional step 224. At decisional step 224, after one time slot, the control logic 114 determines whether the predicted and sensed medium states are still idle based on the signal from the carrier sense module 116, which continues to provide an updated signal based on the predicted medium state received from the network allocation vector 118 and based on the sensed medium state sensed by the carrier sense module 116.

If the predicted and sensed medium states are still idle, the method follows the Yes branch from decisional step 224 and returns to step 216 where the back-off time is again decremented by 1. However, if the predicted and sensed medium states are not still idle, the method follows the No branch from decisional step 224 to step 226. At step 226, the control logic 114 deactivates the back-off module 112.

At decisional step 228, the control logic 114 determines whether the predicted and sensed medium states are idle again based on the signal from the carrier sense module 116, which continues to provide an updated signal based on the predicted medium state received from the network allocation vector 118 and based on the sensed medium state sensed by the carrier sense module 116.

If the predicted and sensed medium states are still busy, the method follows the No branch and remains at decisional step 228 until they are idle. If the predicted and sensed medium states are idle again, the method follows the Yes branch from decisional step 228 to decisional step 230.

At decisional step 230, the control logic 114 determines whether the station 102 has a new priority. If the station 102 has the same priority as before, the method follows the No branch from decisional step 230 and returns to step 214 where the back-off module 112 is activated again. If the station 102 does have a new priority, the method follows the Yes branch from decisional step 230 and returns to step 212 where a back-off time is selected based on the new priority.

Figure 3:
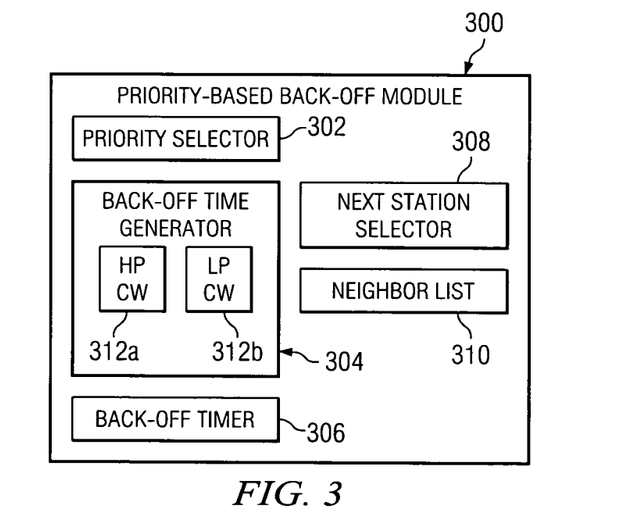
FIG. 3 is a block diagram illustrating the priority-based back-off module of FIG. 1 for use in an independent basic service set (BSS) in accordance with one embodiment of the present invention.

FIG. 3 is a block diagram illustrating a priority-based back-off module 300 in accordance with one embodiment of the present invention. The back-off module 300 may be used as the back-off module 112 when the system 100 comprises an independent BSS.

The back-off module 300 comprises a priority selector 302, a back-off time generator 304, a back-off timer 306, a next station selector 308, and a neighbor list 310. It will be understood that the back-off module 300 may comprise any other suitable components without departing from the scope of the present invention.

The priority selector 302 is operable to select a priority for the station 102 based on a station identifier received from another station 102. According to one embodiment, high priority station identification information carried in a data packet or other packet may be transmitted by a station 102 as it is releasing its rights to access the medium 104. The high priority station identification information comprises a station identifier that is operable to identify another station 102 as the high priority station.

For this embodiment, the priority selector 302 is operable to select a low priority for the station 102 until the station 102 receives high priority station identification information with a station identifier that identifies that particular station 102. When the station identifier identifies the station 102, the station 102 is the high priority station 102 until it releases its rights to access the medium 104 and transmits high priority station identification information that identifies another station 102 as the high priority station.

If the high priority station is in a back-off procedure and the wireless medium 104 becomes busy, the high priority station fails to win the wireless medium access right. If the packet transmission is not successful or the high priority station fails to win the medium access right, the control logic 114 will notify the priority selector 302 to change its priority to low priority.

The back-off time generator 304 comprises a plurality of contention windows 312 and is operable to generate a back-off time for the back-off timer 306 based on the priority of the station 102 as determined by the priority selector 302. According to one embodiment, the back-off time generator 304 comprises a high priority contention window (HP CW) 312a and a low priority contention window (LP CW) 312b, with the low priority contention window 312b having longer minimum and maximum contention windows compared to the high priority contention window 312a.

The back-off time generator 304 is operable to randomly select a back-off time from a contention window 312 corresponding to the priority of the station 102. Thus, when the priority selector 302 determines that the station 102 is in a high priority state, the back-off time generator 304 is operable to randomly select a back-off time from the high priority contention window 312a. Similarly, when the priority selector 302 determines that the station 102 is in a low priority state, the back-off time generator 304 is operable to randomly select a back-off time from the low priority contention window 312b.

Although this embodiment includes two contention windows 312, it will be understood that the back-off time generator 304 may comprise any suitable number of contention windows 312 corresponding to the number of possible priorities for the station 102 without departing from the scope of the present invention.

The next station selector 308 of the station 102 of the current transmission opportunity owner is operable to select the next station 102 that is to be the high priority station 102 after the current high priority station 102 releases its rights to access the medium 104. The next station selector 308 is also operable to provide high priority station identification information that includes a station identifier corresponding to the selected next station 102 for transmission to the other stations 102.

As described in more detail below, the next station selector 308 is operable to use the neighbor list 310 in order to make the determination of which station 102 should be the next high priority station. The neighbor list 310 comprises a list of the one-hop neighbors of the station 102. The next station selector 308 may use a weight-based algorithm, a probability-based algorithm, or any other suitable algorithm in order to select the next high priority station.

For one embodiment in which the next station selector 308 uses a weight-based algorithm, a selection weight calculation interval (SWCI) is defined. After each SWCI, the selection weight of each station 102 in the neighbor list 310 is calculated based on each station's estimated load. The SWCI comprises a multiple or a submultiple of the beacon interval of the independent BSS.

Each station 102 counts the transmit opportunity (TXOP) number of its one-hop neighbors in each SWCI. For example, assume the current SWCI is the $n^{th}$ SWCI. After a station 102 receives a TXOP-ending data frame, the station 102 decides if the source station 102 is in its neighbor list 310. If the source station 102 is not in the neighbor list 310, that station 102 is put in the neighbor list 310, and the number of the newly added neighbors ($N_{new}$) in the $n^{th}$ SWCI increases by one. If the source station 102 is in the neighbor list 310, the TXOP number ($NUM_j^n$) of this station 102 in the $n^{th}$ SWCI increases by one.

At the end of the $n^{th}$ SWCI, each neighbor added to the neighbor list 310 in the $n^{th}$ SWCI will be assigned a weight as follows:

$$W_{new} = \frac{\text{total\_weight}}{N_{new} + N_{old}},$$

where $W_{new}$ is the weight allocated to the newly added neighbors in the $n^{th}$ SWCI, $N_{new}$ is the total number of the newly added neighbors in the $n^{th}$ SWCI, and $N_{old}$ is the total number of neighbors added before the end of the $(n-1)^{th}$ SWCI.

For each neighbor added to the neighbor list 310 before the end of the $(n-2)^{th}$ SWCI, its load in the $(n+1)^{th}$ SWCI is estimated as follows:

$$NUM_j^{n+1} = NUM_j^{n-1} * \partial + NUM_j^n * (1-\partial)$$

where $NUM_j^n$ is the load of the neighbor j in the $n^{th}$ SWCI and $\partial$ is the moving average parameter.

For each neighbor added to the neighbor list 310 in the $(n-1)^{th}$ SWCI, its load in the $(n+1)^{th}$ SWCI is estimated as follows:

$$NUM_j^{n+1} = NUM_j^n,$$

where $NUM_j^n$ is the load of the neighbor j in the $n^{th}$ SWCI.

The weight of the neighbor j added before the end of the $(n-1)^{th}$ SWCI is allocated according to:

$$W_j^{n+1} = \frac{(\text{total\_weight} - NW_{new}) * NUM_j^{n+1}}{NUM_{total}^{n+1}},$$

where $W_j^{n+1}$ is the weight allocated to neighbor j in the $(n+1)^{th}$ SWCI, $NW_{new}$ is the total weight allocated to the added neighbors in the $n^{th}$ SWCI, $NUM_j^{n+1}$ is the estimated load of neighbor j in the $(n+1)^{th}$ SWCI, and $NUM_{total}^{n+1}$ is the total load of the neighbors added to the neighbor list 310 before the end of the $(n-1)^{th}$ SWCI.

The neighbors are selected by a round robin method based on the weight allocated to each neighbor. Thus, if the number of TXOP selected by the station 102 equals the weight allocated to the neighbor, the next neighbor in the neighbor list 310 is selected.

For one embodiment in which the next station selector 308 uses a probability-based algorithm, a selection probability calculation interval (SPCI) is defined. After each SPCI, the selection probability of each station 102 in the neighbor list 310 is calculated based on each station's estimated load. The SPCI comprises a multiple or a submultiple of the beacon interval of the independent BSS.

Each station 102 counts the TXOP number of its one-hop neighbors in each SPCI. For example, assume the current SPCI is the $n^{th}$ SPCI. After a station 102 receives a TXOP-ending data frame, the station 102 decides if the source station 102 is in its neighbor list 310. If the source station 102 is not in the neighbor list 310, that station 102 is put in the neighbor list 310, and the number of the newly added neighbors ($N_{new}$) increases by one. If the source station 102 is in the neighbor list 310, the TXOP number ($NUM_j^n$) of this station 102 in the $n^{th}$ SPCI increases by one.

At the end of the $n^{th}$ SPCI, each neighbor added to the neighbor list 310 in the $n^{th}$ SPCI will be assigned a probability as follows:

$$P_{new} = \frac{\text{total\_probability}}{N_{new} + N_{old}},$$

where $P_{new}$ is the probability allocated to the newly added neighbors in the $n^{th}$ SPCI total\_probability is the total probability one station 102 can allocate to its neighbors, $N_{new}$ is the total number of the newly added neighbors in the $N^{th}$ SPCI, and $N_{old}$ is the total number of the neighbors added before the end of the $(n-1)^{th}$ SPCI.

For each neighbor added to the neighbor list 310 before the end of the $(n-2)^{th}$ SPCI, its load in the $(n+1)^{th}$ SPCI is estimated as follows:

$$NUM_j^{n+1} = NUM_j^{n-1} * \partial + NUM_j^n * (1-\partial),$$

where $NUM_j^n$ is the load of the neighbor j in the $n^{th}$ SPCI and $\partial$ is the moving average parameter.

For each neighbor added to the neighbor list 310 in the $(n-1)^{th}$ SPCI, its load in the $(n+1)^{th}$ SPCI is estimated as follows:

$$NUM_j^{n+1} = NUM_j^n,$$

where $NUM_j^n$ is the load of the neighbor j in the $n^{th}$ SPCI.

The probability of the neighbor j added before the end of the $(n-1)^{th}$ SPCI is allocated according to:

$$P_j^{n+1} = \frac{(\text{total\_probability} - NP_{new}) * NUM_j^{n+1}}{NUM_{total}^{n+1}},$$

where $P_j^{n+1}$ is the probability allocated to the neighbor j in the $(n+1)^{th}$ SPCI, $NP_{new}$ is the total probability allocated to the added neighbors in the $n^{th}$ SPCI, $NUM_j^{n+1}$ is the estimated load of neighbor j in the $(n+1)^{th}$ SPCI, and $NUM_{total}^{n+1}$ is the total load of neighbors added to the neighbor list 310 before the $n^{th}$ SPCI.

The neighbors are selected based on the probability allocated to each neighbor. Thus, each neighbor has a low probability threshold and a high probability threshold. After its TXOP, the station 102 creates a random number that is smaller than 1 and larger than 0. If the random number is in the range of one neighbor's low probability threshold and high probability threshold, this neighbor is selected as the next high priority station.

Figure 4:
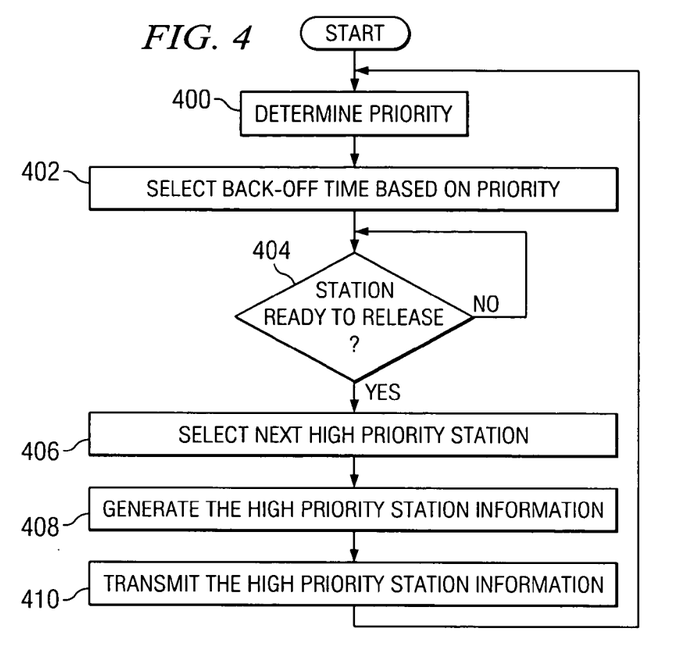
FIG. 4 is a flow diagram illustrating a method for providing a priority-based, low-collision DCF using the back-off module of FIG. 3 in accordance with one embodiment of the present invention.

FIG. 4 is a flow diagram illustrating a method for providing a priority-based, low-collision DCF using the back-off module 300 in accordance with one embodiment of the present invention. The method begins at step 400 where the priority selector 302 determines the priority of the station 102. For example, the priority selector 302 determines the priority based on a station identifier received in high priority station identification information carried by a data or other packet received from another station 102. The high priority station identification information comprises a station identifier that is operable to identify a station 102 as the high priority station. For this embodiment, the priority selector 302 determines that the station 102 is in a high priority state when the high priority station identification information has a station identifier that identifies that particular station 102. Otherwise, the priority selector 302 determines that the station 102 is in a low priority state.

At step 402, the back-off time generator 304 randomly selects any back-off times needed for the back-off timer 306 using the high priority contention window 312a or the low priority contention window 312b based on the station's priority.

At decisional step 404, a determination is made regarding whether the station 102 is ready to release its rights to access the medium 104. If the station 102 is not ready to release its rights, the method follows the No branch from decisional step 404 and remains at decisional step 404 until the station 102 is ready to release its rights.

When the station 102 is ready to release its rights to access the medium 104, the method follows the Yes branch from decisional step 404 to step 406. At step 406, the next station selector 308 selects the next high priority station using the neighbor list 310. The next station selector 308 may select the next high priority station with a weight-based algorithm, a probability-based algorithm, or any other suitable algorithm.

At step 408, the station 102 generates high priority station identification information that includes the station identifier for the next high priority station selected in step 406. At step 410, the station 102 transmits the high priority station identification information carried by a data packet or other packet, and the method returns to step 400 where the priority selector 302 again determines the priority of the station 102.

Figure 5:
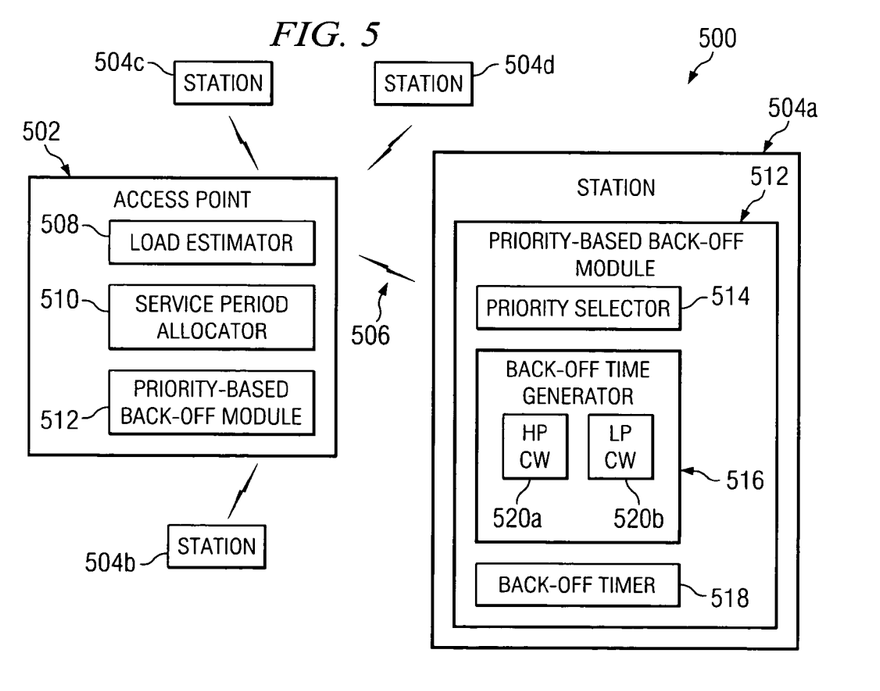
FIG. 5 is a block diagram illustrating a system for providing a priority-based, low-collision DCF for use in an infrastructure BSS in accordance with one embodiment of the present invention.

FIG. 5 is a block diagram illustrating a system 500 for providing a priority-based, low-collision DCF in accordance with one embodiment of the present invention. For this embodiment, the system 500 comprises an infrastructure BSS. The system 500 comprises an access point 502 and a plurality of stations 504 that are operable to communicate with each other, over a wireless medium 506.

The system 500 is operable to provide the stations 504 and the access point 502 with access to the medium 506 based on a super-frame, low collision DCF. For this embodiment, a super-frame is defined that is a submultiple of the beacon interval. The super-frame comprises a service period for the access point 502 and a service period for each station 504. The length of each service period is based on the load of the corresponding station 504 and the access point 502.

The access point 502 comprises a load estimator 508 and a service period allocator 510. It will be understood that the access point 502 may comprise any other suitable components without departing from the scope of the present invention. The load estimator 508 is operable to estimate the load of each station 504 and the access point 502, and the service period allocator 510 is operable to allocate service periods in the super-frame to each station 504 and the access point 502 according to each station's load.

The access point 502 is also operable to transmit a broadcast management message with service period information to each station 504. The service period information comprises a service start time and a service end time relative to the super-frame start time for each station 504 and the access point 502.

The station 504a is illustrated in detail; however, it will be understood that the components illustrated in the station 504a are also implemented in the other stations 504b-d and the access point 502. In addition, although the illustrated embodiment includes four stations 504a-d, it will be understood that the system 500 may comprise any suitable number of stations 504 without departing from the scope of the present invention.

Each station 504 and the access point 502 comprise a priority-based back-off module 512. The back-off module 512 may be used as the back-off module 112 when the system 100 comprises an infrastructure BSS, such as the system 500. It will be understood that the stations 504 and the access point 502 may comprise any other suitable components, such as those described in connection with the stations 102 of FIG. 1, without departing from the scope of the present invention.

The back-off module 512 comprises a priority selector 514, a back-off time generator 516, and a back-off timer 518, in addition to any other suitable components. The priority selector 514 is operable to select a priority for the station 504 and the access point 502 based on the service period allocation provided by the access point 502.

For one embodiment, the priority selector 514 is operable to select a high priority for the station 504 or the access point 502 during the service period for that station 504 and the access point 502. Otherwise, the priority selector 514 is operable to select a low priority for the station 504 and the access point 502.

The back-off time generator 516 comprises a plurality of contention windows 520 and is operable to generate a back-off time for the back-off timer 518 based on the priority of the station 504 or the access point 502 as determined by the priority selector 514. According to one embodiment, the back-off time generator 516 comprises a high priority contention window (HP CW) 520a and a low priority contention window (LP CW) 520b, with the low priority contention window 520b having longer minimum and maximum contention windows compared to the high priority contention window 520a.

The back-off time generator 516 is operable to randomly select a back-off time from a contention window 520 corresponding to the priority of the station 504 or the access point 502. Thus, when the priority selector 514 determines that the station 504 or the access point 502 is in a high priority state, the back-off time generator 516 is operable to randomly select a back-off time from the high priority contention window 520a. Similarly, when the priority selector 514 determines that the station 504 or the access point 502 is in a low priority state, the back-off time generator 516 is operable to randomly select a back-off time from the low priority contention window 520b.

Although this embodiment includes two contention windows 520, it will be understood that the back-off time generator 516 may comprise any suitable number of contention windows 520 corresponding to the number of possible priorities for the station 504 and the access point 502 without departing from the scope of the present invention.

For one embodiment, after the high priority station 504 or the high priority access point 502 gets the right to access the medium 506 through the back-off process, the high priority station 504 or the high priority access point 502 may continue to transmit all the frames buffered in its queue if the frames are transmitted correctly until all the buffered frames are transmitted or until its service period comes to an end. If the required response (such as an acknowledgement frame) is not received correctly, the back-off process may be used to acquire the right to access the medium 506 again. If there are no buffered frames in the high priority station 504 or the high priority access point 502 and there are some packets coming from an upper layer after some time, the station 504 or the access point 502 may use the back-off process to acquire the right to access the medium 506 again. Alternatively, if a station 504 or the access point 502 becomes the high priority station and the medium 506 stays idle for one DCF Inter-Frame Space (DIFS), the station 504 or the access point 502 may acquire the right to access the medium 506 without performing the back-off process.

The access point 502 comprises the central control point in this system 500. At the end of a load estimation interval (LEI), which comprises a multiple of the super-frame, the load estimator 508 estimates the load of each station 504 and the access point 502, and the service period allocator 510 allocates a service period to each station 504 and the access point 502 according to its load. Then the access point 502 sends a broadcast management message that includes the service period information of each station 504 and the access point 502.

The access point 502 resolves all the transmitted packets belonging to its BSS and adds the medium time to the source station 504 or the access point 502. If one station 504 or the access point 502 starts to send packets in this load estimation interval, the access point 502 marks it as a newly added station 504 or the newly added access point 502.

Assume the current LEI is the $n^{th}$ LEI. For the newly added station 504 or the newly added access point 502 in the $n^{th}$ LEI, the access point 502 allocates the service period for the (n+1)$^{th}$ LEI at the end of the $n^{th}$ LEI as follows:

$$SP_{new}^{n+1} = \frac{SF}{N_{new} + N_{old}},$$

where $SP_{new}^{n+1}$ is the service period allocated to the newly added station 504 or the newly added access point 502, SF is the medium time of the super-frame that the access point 502 can allocate to all the stations 504 and the access point 502 that are in the BSS, $N_{new}$ is the total number of newly added stations 504 and the newly added access point 502 in the $n^{th}$ LEI, and $N_{old}$ is the total number of stations 504 or the access point 502 added before the end of the $(n-1)^{th}$ LEI.

For each station 504 or the access point 502 added to the BSS before the end of the $(n-2)^{th}$ LEI, its load in the $(n+1)^{th}$ LEI is estimated as follows:

$$MT_j^{n+1} = MT_j^{n-1} * \partial + MT_j^n * (1-\partial),$$

where $MT_j^n$ is the load of station j in the $n^{th}$ LEI and $\partial$ is the moving average parameter.

For each station 504 or the access point 502 added to the BSS in the $(n-1)^{th}$ LEI, its load in the $(n+1)^{th}$ LEI is estimated as follows:

$$MT_j^{n+1} = MT_j^n,$$

where $MT_j^n$ is the load of station j in the n LEI.

If the estimated load of station j in the next LEI is lower than the mean load, the access point 502 allocates the service period of station j as follows:

$$SP_j^{n+1} = \frac{factor * MT_j^{n+1}}{loadEstInterval},$$

where $SP_j^{n+1}$ is the service period allocated to station j in the $(n+1)^{th}$ LEI and loadEstInterval is the load estimation interval.

If the estimated load of station j in the next LEI is larger than mean load, the access point 502 allocates the service period of station j as follows:

$$SP_j^{n+1} = (SF - SP_{new}^{n+1} - SP_{low\_load}^{n+1}) * \frac{MT_j^{n+1}}{\sum_{i \in high\_load\_STA\_SET} MT_i^{n+1}},$$

where $SP_{new}^{n+1}$ is the service period of all the newly added stations 504 and the newly added access point 502 in the $n^{th}$ LEI and $SP_{low\_load}^{n+1}$ is the service period of all the low-load stations 504 and the low-load access point 502.

Using the system 500, an effective power saving mode may be implemented according to one embodiment. If a station 504 is in a power saving mode, that station 504 becomes active only during its own service period and during the service period of the access point 502. At other times, the station 504 is in a sleep state. If a station 504 is in the power saving mode, another station 504 may send frames for that station 504 to the access point 502 instead of sending the frames directly to the destination station 504. The access point 502 may then forward these frames to the destination station 504. Thus, no direct link protocol is established with a station 504 that is in the power saving mode for this embodiment.

Figure 6:
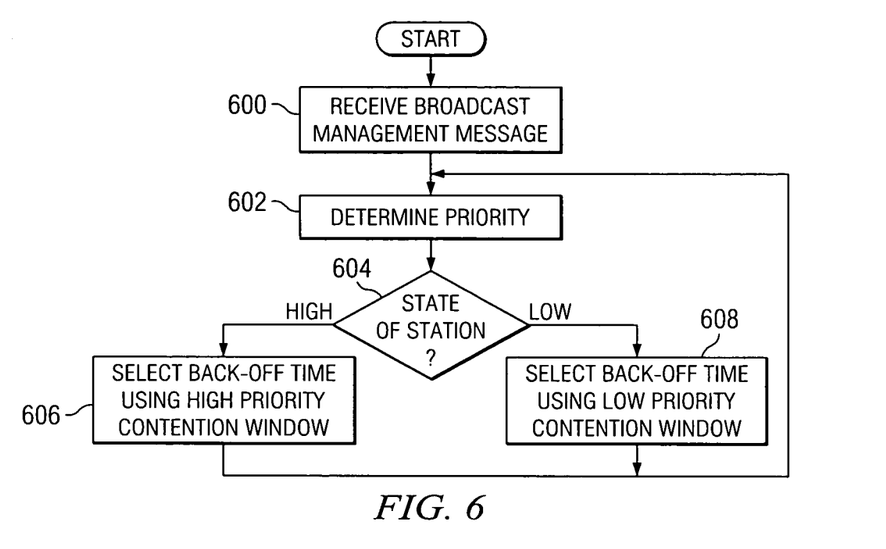
FIG. 6 is a flow diagram illustrating a method for providing a priority-based, low-collision DCF from the perspective of the station of FIG. 5 in accordance with one embodiment of the present invention.

FIG. 6 is a flow diagram illustrating a method for providing a priority-based, low-collision DCF from the perspective of the station 504 or the access point 502 in accordance with one embodiment of the present invention. The method begins at step 600 where the back-off module 512 receives a broadcast management message from the access point 502.

At step 602, the priority selector 514 determines a priority for the station 504 or the access point 502 based on the broadcast management message, which identifies the service periods for the access point 502 and all the stations 504 in each super-frame. Thus, if the priority selector 514 determines that it is currently within a service period for its own station 504 or the access point 502, the priority selector 514 determines that the station 504 or the access point 502 is in a high priority state. Otherwise, the priority selector 514 determines that the station 504 or the access point 502 is in a low priority state.

At decisional step 604, a determination is made regarding whether the station 504 or the access point 502 is in a high priority state or a low priority state. If the station 504 or the access point 502 is in a high priority state, the method follows the High branch from decisional step 604 to step 606. At step 606, the back-off time generator 516 randomly selects any back-off times needed for the back-off timer 518 using the high priority contention window 520a.

Returning to decisional step 604, if the station 504 or the access point 502 is in a low priority state, the method follows the Low branch from decisional step 604 to step 608. At step 608, the back-off time generator 516 randomly selects any back-off times needed for the back-off timer 518 using the low priority contention window 520b.

From steps 606 and 608, the method returns to step 602 where the priority selector 514 again determines the priority of the station 504 or the access point 502 based on the service period allocation provided by the access point 502. It will be understood that the method may be repeated any time that a new broadcast management message is received from the access point 502.

Figure 7:
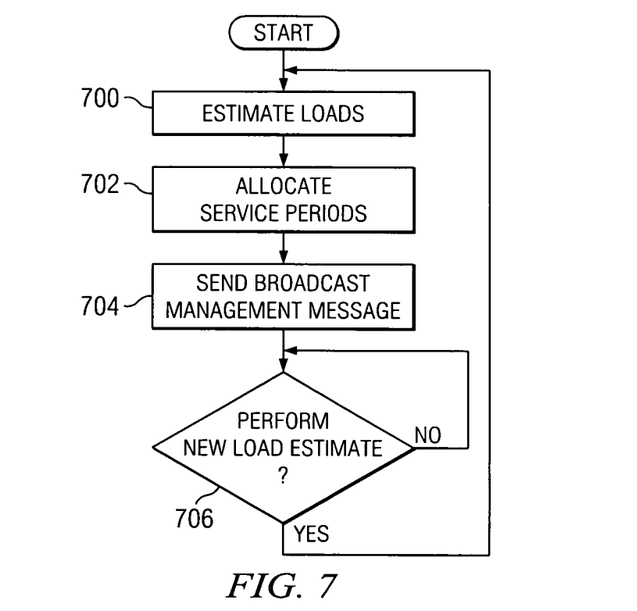
FIG. 7 is a flow diagram illustrating a method for providing a priority-based, low-collision DCF from the perspective of the access point of FIG. 5 in accordance with one embodiment of the present invention.

FIG. 7 is a flow diagram illustrating a method for providing a priority-based, low-collision DCF from the perspective of the access point 502 in accordance with one embodiment of the present invention. The method begins at step 700 where the load estimator 508 of the access point 502 estimates the load of each station 504 and the access point 502. At step 702, the service period allocator 510 of the access point 502 allocates service periods to the access point 502 and to each station 504 based on the estimations of the load estimator 508. At step 704, the access point 502 sends a broadcast management message to the stations 504 that includes the service period information.

At decisional step 706, a determination is made regarding whether or not a new load estimation is to be performed. If a new load estimation is not to be performed, the method follows the No branch from decisional step 706 and remains at decisional step 706 until the access point 502 is ready to perform a new load estimation.

If a new load estimation is to be performed, the method follows the Yes branch from decisional step 706 and returns to step 700 where the load estimator 508 estimates loads for the stations 504 again.

Although the present invention has been described with several embodiments, various changes and modifications may be suggested to one skilled in the art. It is intended that the present invention encompass such changes and modifications as fall within the scope of the appended claims.

What is claimed is:

1. A method for providing a priority-based, low-collision distributed coordination function (DCF) in a wireless network comprising a plurality of stations, the method comprising:
   determining a priority for a first station from one of a high priority and a low priority;
   selecting a back-off time for the first station based on the priority, wherein the back-off time for a current high priority station among the plurality of stations is shorter than the back-off time for current low priority stations among the plurality of stations;
   selecting a next high priority station using a probability based algorithm configured to define a selection probability calculation interval for which a selection probability of each of the plurality of stations to be selected as the high priority station during a current selection interval is based on an estimated load for the respective station that is estimated based on the respective station's load during a prior selection interval;
   determining a low probability threshold and a high probability threshold for the first station and for each neighbor station among the plurality of stations in a neighbor list within an interval, wherein the first station is further configured to generate a bounded random number;
   selecting the next high priority station from the neighbor list such that the bounded random number is greater than the low probability threshold of the next high priority station and lower than the high probability threshold of the next high priority station; and
   transmitting data relating to the next high priority station after the back-off time has elapsed.

2. The method of claim 1, further comprising generating high priority station information.

3. The method of claim 2, wherein the high priority station information comprises at least one station identifier for the next high priority station.

4. The method of claim 1, further comprising:
   determining a priority for the next high priority station; and
   selecting a back-off time for the next high priority station based on the priority for the next high priority station, wherein the priority for the next high priority station is different from the priority for the first station.

5. The method of claim 1, further comprising determining a priority for a plurality of stations, the priority for one of the plurality of stations comprising the high priority and the priority for the remaining plurality of stations comprising the low priority.

6. The method of claim 5, further comprising selecting a contention period for the high priority station from a high priority contention window and selecting a contention period for at least one of the low priority stations from a low priority contention window.

7. The method of claim 6, the high priority contention window comprising a minimum contention window and a maximum contention window, the low priority contention window comprising a minimum contention window and a maximum contention window, wherein the minimum contention window for the low priority contention window is longer than the minimum contention window for the high priority contention window, and wherein the maximum contention window for the low priority contention window is longer than the maximum contention window for the high priority contention window.

8. A method for providing a priority-based, low-collision distributed coordination function (DCF) in a wireless network comprising a plurality of stations, the method comprising:
   receiving high priority station identification information at a first of the plurality of stations from a second of the plurality of stations as the second station is releasing access to a medium shared by the plurality of stations, the information comprising a station identifier for one of the plurality of stations having priority rights over a remainder of the plurality of stations to transmit next in the shared medium;
   determining, in the first station, a priority for the first station based on the high priority station identification information, each of the plurality of stations having one of a high priority and a low priority, the station having priority rights to transmit having the high priority and the remainder of the plurality of stations having the low priority, wherein the high priority station for a selection interval is selected using a probability based algorithm configured to define a selection probability calculation interval for which a selection probability of each of the plurality of stations during the selection interval is based on an estimated load for the respective station that is estimated based on the respective station's load during a prior selection interval; and
   selecting a back-off time for the first station based on the priority of the first station, wherein the back-off time corresponds to the priority of the first base station and is shorter when the first station has the high priority than when the first station has the low priority.

9. The method of claim 8, the high priority station identification information comprising a station identifier operable to identify the high priority station.

10. The method of claim 9, wherein determining a priority for the first station based on the information comprises determining whether the station identifier identifies the first station.

11. The method of claim 9, wherein the station identifier identifies the first station as the high priority station.

12. The method of claim 9, wherein the station identifier identifies one of the plurality of stations other than the first station as the high priority station, and wherein determining a priority for the first station based on the information comprises determining the first station comprises a low priority.

13. The method of claim 8, further comprising:
   receiving the high priority station identification information at a plurality of stations from the second station; and
   determining a priority for each of the plurality of stations based on the high priority station identification information, the priority for one of the plurality of stations comprising the high priority and the priority for the remaining plurality of stations comprising the low priority.

14. The method of claim 13, further comprising selecting a contention period for the high priority station from a high priority contention window and selecting a contention period for at least one of the low priority stations from a low priority contention window.

15. The method of claim 14, the high priority contention window comprising a minimum contention window and a maximum contention window, the low priority contention window comprising a minimum contention window and a maximum contention window, wherein the minimum contention window for the low priority contention window is longer than the minimum contention window for the high priority contention window, and wherein the maximum contention window for the low priority contention window is longer than the maximum contention window for the high priority contention window.

16. A method for providing a priority-based, low-collision distributed coordination function (DCF) in a wireless network comprising a plurality of stations, the method comprising:
  at a first station that comprises a high priority station, selecting a next high priority station from a neighbor list for the first station, wherein the selection is performed using a weight based algorithm that defines a selection weight calculation interval (SWCI) that calculates a selection weight of each station in the neighbor list based on an estimated load for the respective station that is estimated based on the respective station's load during a prior selection interval; wherein one of the plurality of stations is assigned a high priority based on the selection weight calculated for that one station and a remainder of the plurality of stations are each assigned a low priority based on the selection weight calculated for the corresponding station, wherein a back-off time for the high priority station is shorter than the back-off time for the low priority stations; and
  transmitting high priority station identification information from the first station to the remaining plurality of stations, the information operable to identify the selected next high priority station having priority rights over other stations in the remaining plurality of stations to transmit next in a shared medium, wherein the information comprises a station identifier.

17. The method of claim 16, further comprising adding at least one neighbor to the neighbor list, wherein the at least one neighbor added is assigned a weight that is a function of the total weight of all neighbors, any other newly added neighbors during the SWCI, and a total number of neighbors added before the end of the SWCI.

18. The method of claim 17, wherein the function is:

$$W_{new} = \frac{\text{total\_weight}}{N_{new} + N_{old}},$$

where $W_{new}$ is a weight allocated to newly added neighbors in the SWCI, $N_{new}$ is a total number of the newly added neighbors in the SWCI, and $N_{old}$ is a total number of neighbors added before an end of the previous SWCI.

19. The method of claim 16, further comprising generating the high priority station identification information at the first station.

20. A priority-based back-off module within a station in a system including a plurality of stations, each station including the priority-based back-off module, the priority-based back-off module configured to provide a low-collision distributed coordination function (DCF) in a wireless network, the back-off module comprising:
  a priority selector configured to select a priority from one of a high priority and a low priority for the station based on information received by the station using at least one receiver;
  a back-off time generator configured to generate a back-off time based on the selected priority, wherein the back-off time for a current high priority station among the plurality of stations is shorter than the back-off time for current low priority stations among the plurality of stations; and
  a next high priority station selector configured to use a probability-based algorithm to determine a next high priority station, wherein the probability based algorithm defines a selection probability calculation interval for which a selection probability of each of the plurality of stations during a current selection interval is based on an estimated load for the respective station that is estimated based on the respective station's load during a prior selection interval, and wherein the selection probability calculation interval determines a low probability threshold and a high probability threshold for each neighbor station in a neighbor list within the interval,
  wherein the station is further configured to generate a bounded random number and select the next high priority station from the neighbor list, wherein the bounded random number is greater than the low probability threshold of the next high priority station and less than the high probability threshold for the next high priority station.

21. The priority-based back-off module of claim 20, wherein the priority of one of the plurality of stations comprises the high priority and the priority of a remainder of the plurality of stations comprises the low priority.

22. The priority-based back-off module of claim 20, wherein the priority comprises one of at least three priorities.

23. The priority-based back-off module of claim 20, further comprising a contention period generator configured to generate a contention period based on a high priority contention window when the priority of the station including the priority-based back-off module is the high priority and to generate a contention period based on a low priority contention window when the priority of the station including the priority-based back-off module is the low priority.

24. The priority-based back-off module of claim 20, further comprising:
  the neighbor list of one-hop neighbors for the station,
  wherein the next station selector is configured to select a next high priority station from the neighbor list.

25. The priority-based back-off module of claim 24, wherein the next station selector is configured to select a next high priority station from the neighbor list using a weight-based algorithm.

26. The priority-based back-off module of claim 24, the next station selector configured to select a next high priority station from the neighbor list using the probability-based algorithm.

* * * * *